Jan. 7, 1958  F. K. BENNETT  2,818,732

DEVICE FOR REMOTE TEMPERATURE MEASUREMENT

Filed Feb. 8, 1955

INVENTOR.
FRANK K. BENNETT
BY
Cyrus D. Samuelson
ATTORNEY

2,818,732

DEVICE FOR REMOTE TEMPERATURE MEASUREMENT

Frank K. Bennett, Iselin, N. J., assignor to Gulton Industries, Inc., a corporation of New Jersey Application February 8, 1955, Serial No. 486,879

5 Claims. (Cl. 73—362)

My invention relates to a device for measuring the temperature of remote equipment and material and in particular the measurement of the temperature of moving equipment whose temperature may not be easily obtained by other methods.

A principal object of my invention is to provide a device for measuring the temperature of railroad wheels and wheel bearings.

A further object of my invention is to provide a device for observing the temperature of railroad wheels and wheel bearings over a predetermined distance.

A still further object of my invention is to provide a device for observing the temperature of railroad wheels and wheel bearings over a predetermined distance from a central control point.

Other objects and advantages of my invention will be apparent during the course of the following description.

Figure 1:
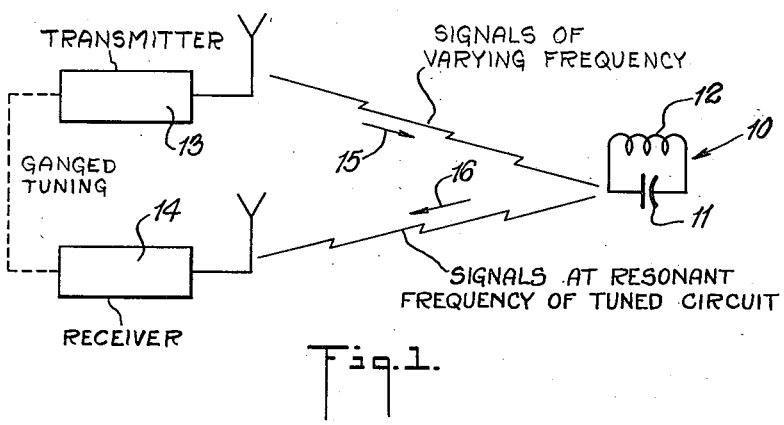
Figure 2:
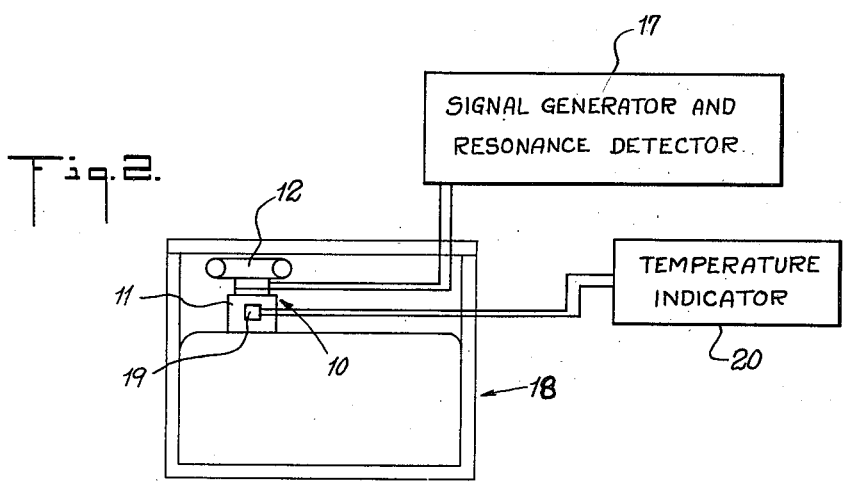
Figure 3:
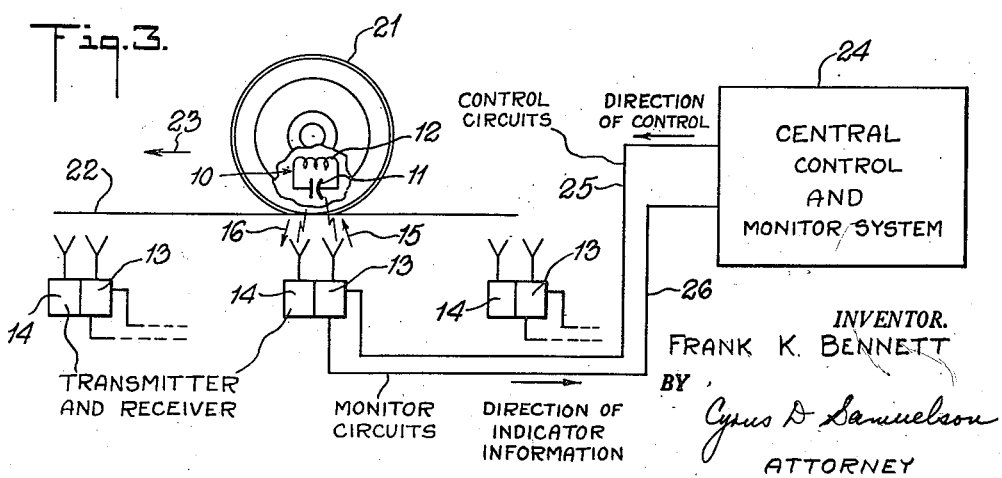

In the accompanying drawings, forming a part of this application, and in which like numerals are employed to designate like parts throughout the same, Figure 1 is a simplified block diagram of one embodiment of my invention, Figure 2 is a block diagram illustrating a method of calibrating the measuring device, and Figure 3 is a block diagram of a temperature measuring system employed to measure the temperature of the wheels and wheel bearings of a moving railroad car.

In the drawings, wherein for the purpose of illustration, is shown a preferred embodiment of my invention, the numeral 10 designates the resonant circuit, the numeral 11 designates the temperature sensitive capacitor, the numeral 12 designates a coil, and the numeral 13 designates a transmitter. The numeral 14 designates a receiver, the numeral 15 designates the direction of original transmission, the numeral 16 designates the direction of return signal, and the numeral 17 designates a signal generator and resonance detector.

The numeral 18 designates the temperature control box, the numeral 19 designates a temperature sensing element, the numeral 20 designates the temperature indicator and the numeral 21 designates the wheel. The numeral 22 designates the track, the numeral 23 designates the direction of travel, the numeral 24 designates the central control and monitor system, the numeral 25 designates the control circuits and the numeral 26 designates the monitor circuits.

Temperature sensitive capacitor 11 may be composed of barium titanate or any other element which changes its dielectric constant with temperature. The titanates, steatites, zirconites and like materials possess this necessary characteristic. Combinations of barium titanate and others of these materials with other compounds will permit control of the characteristics of the capacitor 11. Capacitor 11 and coil 12 make up a resonant circuit 10 which will change in resonant frequency as the values of 11 and 12 are varied. Coil 12 is constructed so that its value does not vary appreciably with temperature, so that the change in resonant frequency of 10 depends on the variation in value of 11. By suitably calibrating the temperature of 11 against the resonant frequency of 10, the temperature of 11 may be determined by the frequency of resonance of 10.

By mounting 10 on a moving object such as wheel 21, it is possible to obtain the temperature of wheel 21 at predetermined points along its path of travel by a simple and economical method. The recording and observation of the temperature of 21 may be observed at a central point such as 24. Several wheel and wheel bearing temperatures may be observed at the central control and monitor sysetm 24, thereby enabling the railroad operators to observe any sudden rise in wheel or wheel bearing temperature in a particular car or train. By being able to stop the train and take corrective measures, hot boxes will be eliminated or materially reduced and the loss of service resulting therefrom will be considerably reduced.

One embodiment of my invention contemplates the transmission of signals of varying frequency by transmitter 13 to resonant circuit 10. When the resonant frequency of 10 is reached by 13, circuit 10 will oscillate at that frequency and will transmit a signal which will be picked up by receiver 14. Receiver 14 has been calibrated for frequency against temperature so that the temperature of temperature sensitive element capacitor 11 is known. The tuned circuits of 13 and 14 are usually ganged to the same frequency in this embodiment.

A second embodiment of my invention contemplates the transmission of pulse signals by transmitter 13. These pulse signals excite 10 at its resonant frequency and 10 radiates a signal at this frequency which is detected by receiver 14 which is searching the band of frequencies within which 10 will be resonant. Receiver 14 may be arranged to lock at the frequency which it receives above a certain fixed value or signals from it may be fed over telephone lines or radio circuits to central control and monitor system where visual and aural monitoring and visual and aural recording of the signals may be used.

In order to calibrate resonant system 10, it is placed in temperature control box 18. Signal generator and resonance detector 17 is used to observe the resonant frequency of 10 at the same time that temperature indicator 20 is utilized to observe the temperature of 11 which is measured by placing temperature sensing element 19 in intimate contact with 11.

Figure 3 illustrates a remote temperature detecting system of my invention. The train is moving in the direction indicated by arrow 23 along track 22. Various transmitters 13 and receivers 14 are located along track 22 and are connected to central control and monitor system 24 by telephone wires or other means. 10 is mounted in as many wheels 21 as it is desired to observe. The operation of the transmitter 13 and receiver 14 is controlled from 24 over control circuits 25 and monitor information is fed from receivers 14 to 24 over monitor circuits 26. The central control and monitor system 24 operator may thus observe the temperature of selected wheels and wheel bearings at selected points along the track and may inform the train crew by radio or other means of any radical change in the temperature of any given wheel or wheel bearing.

The operation of a railroad system will be improved by the employment of a remote temperature indicator constructed and used in accordance with my invention. It will not be necessary to stop trains in order to examine them for hot boxes since there will be continuous check of the temperature of the wheels and wheel bearings. My invention also contemplates the installation of resonant circuits 10 on the wheels of a train and the use of a hand carried transmitter 13-receiver 14 for inspection of all wheels when the train is stopped or when it is in motion. The trainman or other train-employee could easily use such a device which would eliminate the necessity of feeling each wheel and wheel bearing by hand.

While I have described my invention by means of specific examples and in specific embodiments, I do not wish to be limited thereto, for obvious modifications will occur to those skilled in the art without departing from the spirit of my invention or the scope of the subjoined claims.

Having thus described my invention, I claim:

1. A remote temperature measurement system comprising a temperature sensitive capacitor whose dielectric constant varies with temperature and an inductance in a closed circuit, electromagnetic wave transmission and receiving means directed to transmit and receive signals to and from said circuit; said transmission frequency having at least one value in the range of resonant frequencies of said circuit, means in said receiving means responsive to the resonant frequency of the signal emitted by said circuit upon excitation from said transmitted signal, and indicating means cooperating with said receiving means for indicating the temperature affecting said capacitor as a function of the frequency of the received signal.

2. A remote temperature measurement system as described claim 1 wherein said signal directed by said transmission means comprises at least one pulse.

3. A remote temperature measurement system as described in claim 1 wherein said signal directed by said transmission means is a continuous wave of varying frequency.

4. A remote temperature measurement system as described in claim 1 wherein in the tuning of said transmission means and said receiving means is ganged.

5. A remote temperature measurement system as described in claim 1 wherein the temperature sensitive capacitor is composed largely of titanate.

References Cited in the file of this patent

UNITED STATES PATENTS

| | | |
|---|---|---|
| 2,225,668 | Subkow et al. | Dec. 24, 1940 |
| 2,461,646 | Lewis | Feb. 15, 1949 |
| 2,483,097 | McIlwain | Sept. 27, 1949 |
| 2,499,225 | Marshall | Feb. 28, 1950 |
| 2,511,409 | Mayberry | June 13, 1950 |

FOREIGN PATENTS

| | | |
|---|---|---|
| 581,168 | Great Britain | Oct. 3, 1946 |
| 613,116 | Great Britain | Nov. 23, 1948 |